(12) United States Patent
Crowder et al.

(10) Patent No.: US 12,311,940 B2
(45) Date of Patent: May 27, 2025

(54) ADAPTIVE CRUISE CONTROL SYSTEM AND METHOD

(71) Applicant: Bendix Commercial Vehicle Systems LLC, Avon, OH (US)

(72) Inventors: Anna A Crowder, Medina, OH (US); Michael K Lesher, North Ridgeville, OH (US); Mathew J John, Avon, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 322 days.

(21) Appl. No.: 17/940,581

(22) Filed: Sep. 8, 2022

(65) Prior Publication Data

US 2024/0083430 A1 Mar. 14, 2024

(51) Int. Cl.
*B60W 30/16* (2020.01)
*B60K 31/00* (2006.01)

(52) U.S. Cl.
CPC ............ *B60W 30/16* (2013.01); *B60K 31/00* (2013.01); *B60W 2420/403* (2013.01); *B60W 2420/408* (2024.01); *B60W 2520/10* (2013.01); *B60W 2554/4042* (2020.02); *B60W 2554/4043* (2020.02); *B60W 2554/4045* (2020.02); *B60W 2556/65* (2020.02); *B60W 2754/10* (2020.02)

(58) Field of Classification Search
CPC ....... G07C 5/008; G07C 5/08; G06F 3/04817; G06F 3/0482; G06F 3/0488; G06F 1/26; G06F 1/32; G06F 21/31; G06F 1/30; G06F 3/0481; B60R 16/03; H04W 4/40; H04W 4/44; H04W 4/80; H04W 76/12; H04L 12/40; H04L 2012/40215; H04L 2012/40273
See application file for complete search history.

(56) References Cited

U.S. PATENT DOCUMENTS 9,507,016 B2 * 11/2016 Sudou .................... G01S 13/42
10,875,532 B2 12/2020 Matsunaga
(Continued)

FOREIGN PATENT DOCUMENTS

JP 2007-176483 7/2007
KR 20150058889 A * 5/2015 ............ B60R 11/00
WO WO-2023052692 A1 * 4/2023 ........ B60W 30/0953

*Primary Examiner* — Ramon A. Mercado
*Assistant Examiner* — Tyler Roger Robarge
(74) *Attorney, Agent, or Firm* — Crowell & Moring LLP

(57) ABSTRACT

The present disclosure provides systems and methods for an adaptive cruise control that controls a speed of a host vehicle as a passing vehicle quickly passes through a trajectory of the host vehicle. In one form, a system includes at least one processor that is configured to determine that a passing vehicle is entering a trajectory in which the host vehicle is travelling based on a longitudinal speed, a longitudinal acceleration, a lateral speed, and a lateral acceleration of the passing vehicle; determine to maintain a follow distance of an adaptive cruise control system of the host vehicle to at least one target vehicle in the trajectory in which the host vehicle is traveling prior to the passing vehicle entering the trajectory; and to maintain the follow distance to the at least one target vehicle while the passing vehicle passes through the trajectory in which the host vehicle is traveling.

18 Claims, 3 Drawing Sheets

(56) References Cited

U.S. PATENT DOCUMENTS

| | | |
|---|---|---|
| 11,708,075 B2* | 7/2023 | Lewandowski ...... G05D 1/0223 |
| | | 701/96 |
| 11,858,513 B2* | 1/2024 | Jokela ................... B60W 30/16 |
| 2007/0142995 A1 | 6/2007 | Wotlermann |
| 2019/0241184 A1* | 8/2019 | Hayashi ................. G08G 1/167 |
| 2022/0319306 A1* | 10/2022 | Nourkhiz Mahjoub ..................... |
| | | H04W 4/023 |
| 2023/0356716 A1* | 11/2023 | Park ...................... B60W 30/16 |
| 2024/0001926 A1* | 1/2024 | Singh ................... B60W 30/16 |

* cited by examiner

ADAPTIVE CRUISE CONTROL SYSTEM AND METHOD

BACKGROUND

An automotive driver assistance system which allows a driver to set a target speed and then automatically maintains a speed of a vehicle speed at the set target speed is known as a "cruise control" system. Conventional cruise control systems typically have manually actuated controls by which the driver can turn the cruise control system on or off, set a target vehicle speed, and increase or decrease the target vehicle speed.

More advanced adaptive cruise control systems are able to automatically adjust a speed of a vehicle to maintain a safe distance between the vehicle (also known as a host vehicle) and other vehicles ahead (also known as target vehicles). Typically, adaptive cruise controls systems automatically adjust a speed of a host vehicle to maintain at least a three second following distance between the host vehicle and target vehicles ahead.

When a target vehicle in front of the host vehicle is traveling at a speed below a target vehicle speed of the host vehicle, the adaptive cruise control will set the speed of the host vehicle below the target vehicle speed in order to maintain a safe follow distance. However, when circumstances change such that a target vehicle in front of the host vehicle increases its speed or there is no target vehicle in front of the host vehicle, for example, the adaptive cruise control may increase the speed of the host vehicle up to the target speed.

It will be appreciated that problems may arise when a host vehicle using adaptive cruise control is following behind a first target vehicle in a lane at a speed that is less a target speed of the host vehicle and a second target vehicle passes quickly through the lane between the host vehicle and the first target vehicle. For the period of time that the second target vehicle is in front of the host vehicle, the adaptive cruise control may increase the speed of the host vehicle based on maintaining a safe follow distance to the second target vehicle. However, when the second target vehicle exits the lane and the host vehicle is again behind the slower first target vehicle, the adaptive cruise control may have to quickly decelerate the host vehicle in order to establish a safe follow distance to the first target vehicle.

SUMMARY OF THE DISCLOSURE

The present disclose addresses the above problem by providing systems and methods for an adaptive cruise control that is able to better control a speed of a host vehicle as another vehicle quickly passes through a trajectory of the host vehicle.

In one form of the present disclosure, a system is provided that comprises a memory and at least one processor configured to execute instructions stored in the memory.

The at least one processor is configured to determine that a passing vehicle is entering a trajectory in which the host vehicle is travelling based on a longitudinal speed, a longitudinal acceleration, a lateral speed, and a lateral acceleration of the passing vehicle. Further, the at least one processor is configured to, after determining that the passing vehicle is entering the trajectory in which the host vehicle is travelling, determine to maintain a follow distance of an adaptive cruise control system of the host vehicle to at least one target vehicle in the trajectory in which the host vehicle is traveling prior to the passing vehicle entering the trajectory. The at least one processor is additionally configured to maintain the follow distance to the at least one target vehicle while the passing vehicle passes through the trajectory in which the host vehicle and the at least one target vehicle are traveling.

In another form of the present disclosure, a method is provided in which at least one processor of a host vehicle determines that a passing vehicle is entering a trajectory in which the host vehicle is travelling based on a longitudinal speed, a longitudinal acceleration, a lateral speed, and a lateral acceleration of the passing vehicle. After determining that the passing vehicle is entering the trajectory in which the host vehicle is travelling, the at least one processor determines to maintain a follow distance of an adaptive cruise control system of the host vehicle to at least one target vehicle in the trajectory of the host vehicle in which the host vehicle is traveling prior to the passing vehicle entering the trajectory. Further, the at least one processor maintains the follow distance of the adaptive cruise control of the host vehicle to the at least one target vehicle while the passing vehicle passes through the trajectory in which the host vehicle and the target vehicle are traveling.

DETAILED DESCRIPTION OF THE DRAWINGS

The present disclosure is directed to systems and methods for an adaptive cruise control that are able to better control a speed of a host vehicle as another vehicle quickly passes through a trajectory of the host vehicle.

Figure 1:
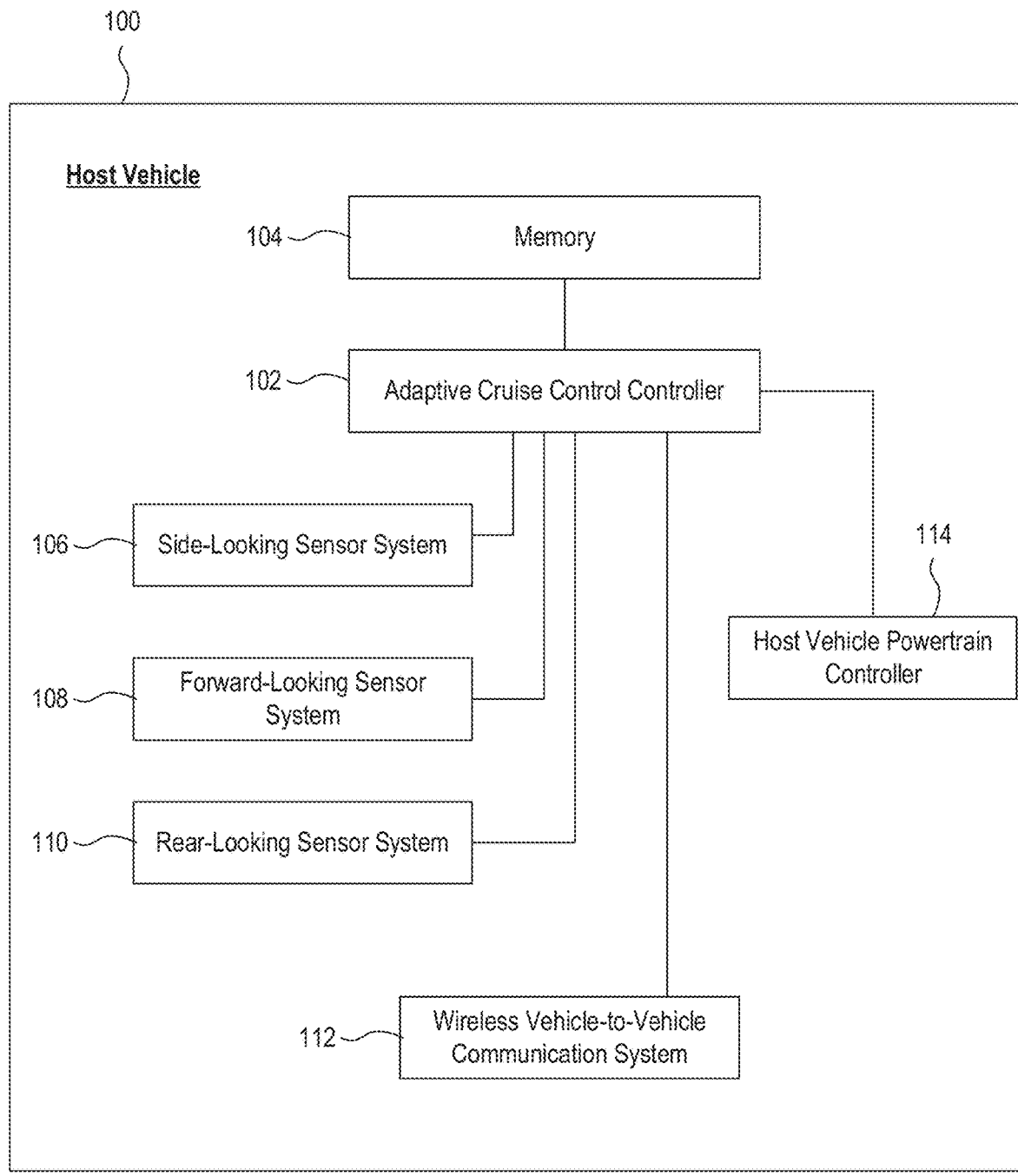
FIG. 1 is a schematic illustration of one form of a host vehicle that includes an adaptive cruise control.

FIG. 1 is a schematic illustration of one form of a host vehicle 100 having an adaptive cruise control. The host vehicle 100 may include an adaptive cruise control controller 102. The cruise control controller 102 may be a stand-alone electronic control unit having its own processor, memory and related hardware for processing of cruise control logic stored in the controller, or may be integrated with other vehicle controllers, such as a powertrain controller.

The cruise control controller 102 may receive vehicle operating parameters pre-stored in a vehicle memory 104 and/or obtained via a vehicle network (e.g., a CANBus) to which other vehicle controllers are connected. Examples of vehicle operating parameters of interest include vehicle speed in the forward direction A, vehicle lateral acceleration, road wheel angle, status of the states of the driver-actuable cruise control operating switches, and for commercial vehicles, tractor mass, trailer mass, tractor and trailer geometry (e.g., tractor and trailer length, axle positions, location of the trailer pivot point on the tractor, current angle of the trailer relative to the tractor, etc.).

The cruise control controller 102 may also receive signals from a side-looking sensor system 106 having side sensors that detect a presence of an adjacent vehicle or other objects; a forward-looking sensor system 108 having forward sensors that detect a presence of a vehicle or other objects in front of the vehicle 100; and/or a rearward-looking sensor system 110 having sensors that detect a presence of a vehicle or other objects behind the vehicle 100. In addition to detecting the presence of a vehicle or other objects, the side-looking sensor system 106, forward-looking sensor system 108, and/or rearward-looking sensor system 110 may additionally generate information that identifies attributes of passing vehicles, or may be used to determine attributes of passing vehicles, such as a longitudinal speed, a longitudinal acceleration, a lateral speed, and a lateral acceleration of passing vehicles. In some implementations, the side-looking sensor system 106, forward-looking sensor system 108, and/or the rearward-looking sensor system 110 may be a positioning sensor such as a radar, a light detection and ranging system (LIDAR), an acoustic sensor, an optical sensor, or a camera.

In some implementations, the cruise control controller 102 may further receive information wirelessly via a vehicle-to-vehicle communication system 112 from other vehicles through the use of vehicle-to-vehicle communications, also known in the art as V2V communications. Vehicle-to-vehicle communications provide the ability for vehicles to wirelessly exchange information such a speed, location, and/or heading a vehicle.

As a part of the operation of the cruise control controller 102, the controller executes instructions that may be part of a program which determines vehicle operating commands for operation of the vehicle's powertrain. These operating commands are sent to the vehicle' powertrain controller 114, which in some implementations includes an engine, transmission and drive axles and wheels (not shown for clarity), for execution.

Figure 2:
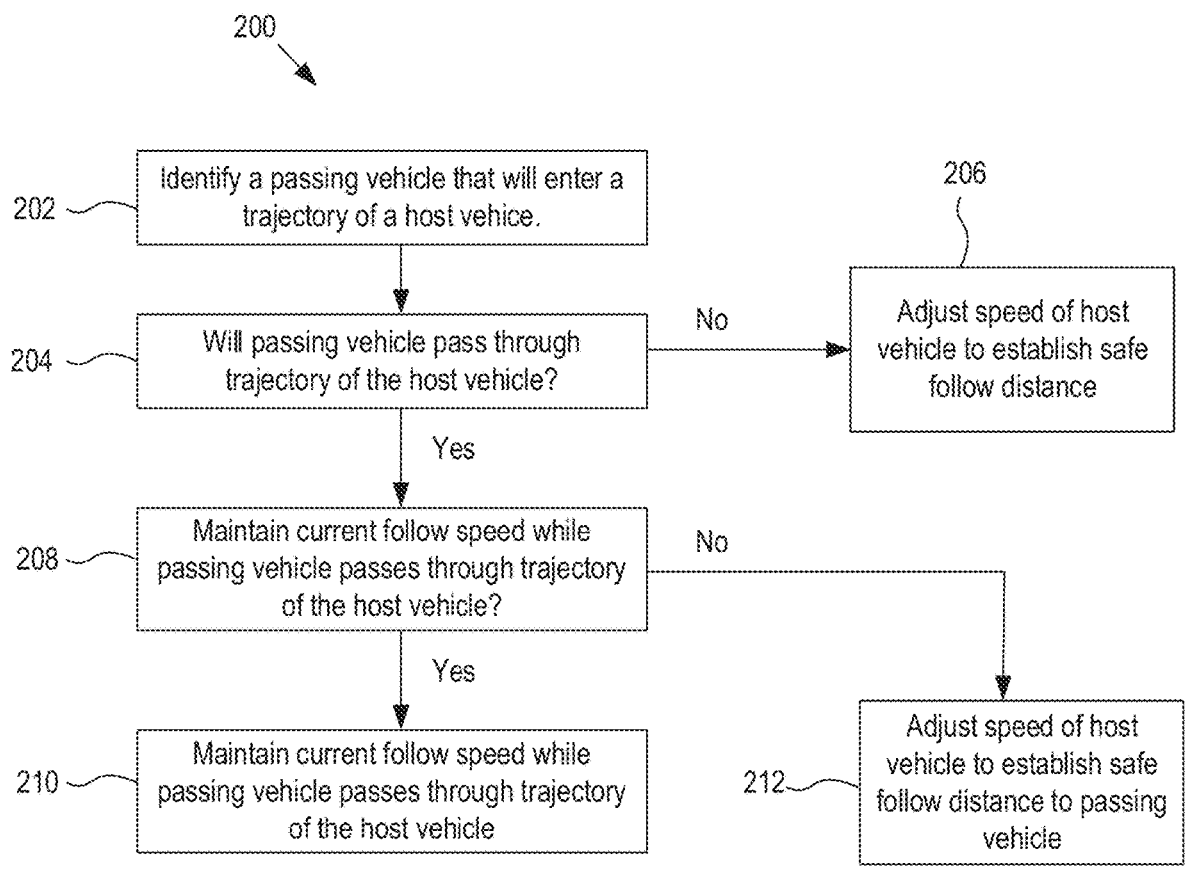
FIG. 2 is a flow chart of one form of a method for an adaptive cruise control that is able to control a speed of a host vehicle as another vehicle quickly passes through a trajectory of the host vehicle.

FIG. 2 is a flow chart of one form of a method for adjusting a speed in an adaptive cruise control based on a trajectory of a passing vehicle.

At step 202, a processor of a host vehicle, such as the host vehicle described above in conjunction with FIG. 1, identifies a passing vehicle that will enter a trajectory of the host vehicle. In some implementations, the processor of the host vehicle determines that the passing vehicle will enter a trajectory of the host vehicle based on information such as on one or more of a longitudinal speed, a longitudinal acceleration, a lateral speed, and a lateral acceleration of the passing vehicle received from at least one of the side-looking sensor system 106, the forward-looking sensor system 108, or the rearward-looking sensor system 110 of the host vehicle. In other implementations, the processor of the host vehicle determines that the passing vehicle will enter a trajectory of the host vehicle based on information received wirelessly 112 from the passing vehicle using vehicle-to-vehicle communications.

At step 204, the processor determines whether the passing vehicle is passing through a trajectory in which a host vehicle is travelling based on one or more of the longitudinal speed, the longitudinal acceleration, the lateral speed, and the lateral acceleration of the passing vehicle.

In some implementations, the processor determines that the passing vehicle is passing through a trajectory in which the host vehicle is traveling when the processor determines that a lateral speed of the passing vehicle is not decreasing at any time while traveling through the trajectory in which the host vehicle is travelling.

In other implementations, the processor determines that the passing vehicle is passing through a trajectory in which the host vehicle is travelling when the processor determines that while a lateral speed of the passing vehicle is decreasing, the lateral speed of the passing vehicle is not decreasing enough for the passing vehicle to stop in, or join in, the trajectory in which the host vehicle is traveling.

In some implementations, the processor of the host vehicle determines the longitudinal speed, the longitudinal acceleration, the lateral speed, and/or the lateral acceleration of the passing vehicle based on information that the processor receives from the side-looking sensor system 106, forward-looking sensor system 108, and/or the rearward-looking sensor system 110 of the host vehicle. However, in other implementations that utilize vehicle-to-vehicle communications, the processor of host vehicle may receive from the pasting vehicle itself the longitudinal speed, the longitudinal acceleration, the lateral speed, and/or the lateral acceleration of the passing vehicle.

When the processor determines at step 204 that the passing vehicle entering a trajectory of the host vehicle is not passing through the trajectory of the host vehicle, at step 206, the adaptive cruise control operates to adjust a speed of the host vehicle to establish a safe follow distance to the passing vehicle as a new target vehicle. The method then repeats at step 202 when a new passing vehicle is detected that is entering a trajectory of the host vehicle.

Alternatively, when the processor determines at step 204 that the passing vehicle entering a trajectory of the host vehicle is passing through the trajectory of the host vehicle, at step 208, the processor determines whether to maintain the current follow distance of the host vehicle to at least one target vehicle in the trajectory of the host vehicle prior to the passing vehicle passing entering the trajectory of the host vehicle.

In some implementations, the processor determines at step 208 whether to maintain the current follow distance of the host system based on whether the host vehicle is travelling at a speed that is less than a target speed of the host vehicle and based on at least one of the longitudinal speed, the longitudinal acceleration, the lateral speed, or the lateral acceleration of the passing vehicle.

When the processor determines that as the passing vehicle passes through the trajectory of the host vehicle, the host vehicle traveling at the current follow distance will be able to maintain a safe distance to both the passing vehicle and the at least one target vehicle in the trajectory of the host vehicle prior to the passing vehicle entering the trajectory of the host vehicle, at step 210, the processor determines to maintain the current follow distance of the host vehicle.

In some implementations, the processor determines to maintain the current follow distance when a longitudinal speed of the host vehicle is less than the longitudinal speed of the passing vehicle.

The method then repeats at step 202 when a new passing vehicle is detected that is entering a trajectory of the host vehicle.

Alternatively, when the processor determines that as the passing vehicle passes through the trajectory of the host vehicle, the host vehicle travelling at the current follow distance will not be able to maintain a safe distance to both the passing vehicle and the at least one target vehicle in the trajectory of the host vehicle prior to the passing vehicle entering the trajectory of the host vehicle, at step 212, the processor determines not to maintain the current follow distance of the host vehicle and adjusts the follow distance of the host vehicle to establish a safe distance between the host vehicle and the passing vehicle.

In some implementations, the processor determines not to maintain the current follow distance of the host vehicle when the longitudinal speed of the host vehicle is faster than the longitudinal speed of the passing vehicle.

The method then repeats at step 202 when a new passing vehicle is detected that is entering a trajectory of the host vehicle.

Figure 3:
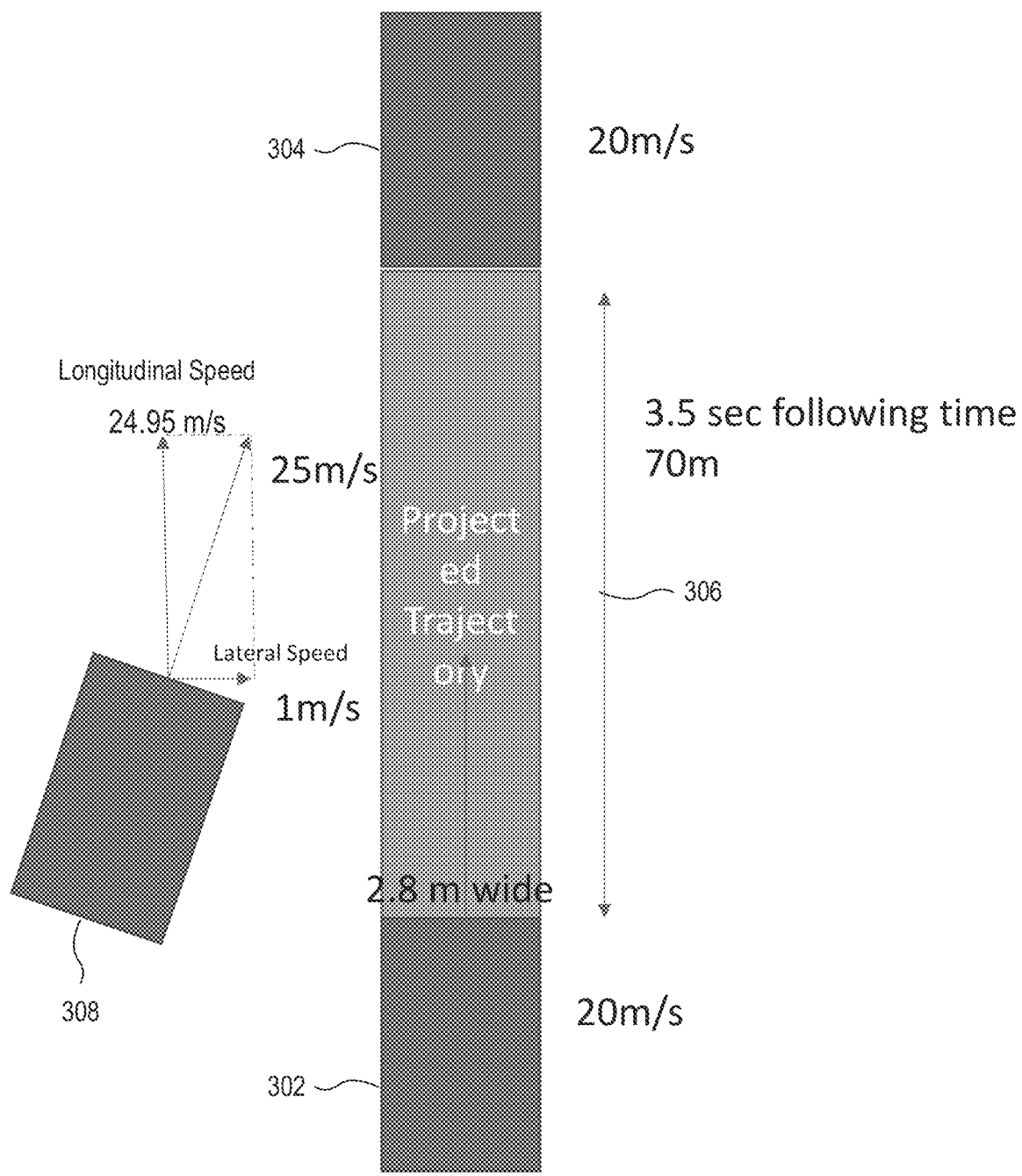
FIG. 3 is a diagram of an illustrative example of an adaptive cruise control that is able to control a speed of a host vehicle as another vehicle quickly passes through a trajectory of the host vehicle.

FIG. 3 is a diagram of an illustrative example of an adaptive cruise control that is able to control a speed of a host vehicle as another vehicle quickly passes through a trajectory of the host vehicle.

As shown in FIG. 3, a host vehicle 302 is following a target vehicle 304. Both the host vehicle 302 and the target vehicle 304 in the illustrative example are travelling at 20 meters per second. Further, an adaptive cruise control of the host vehicle 302 is implementing a 3.5 second follow time 306, generally corresponding to distance of approximately 70 meters between the host vehicle 302 and the target vehicle 304.

The host vehicle 302 identifies a passing vehicle 308 that will enter a trajectory of the host vehicle 302. In some implementations, the processor of the host vehicle determines that the passing vehicle will enter a trajectory of the host vehicle based on information from at least one of a side-looking sensor system, a forward-looking sensor system, or a rearward-looking sensor system of the host vehicle 302. In other implementations, the processor of the host vehicle 302 determines that the passing vehicle 308 will enter a trajectory of the host vehicle 302 based on information received wirelessly from the passing vehicle 308 using vehicle-to-vehicle communications.

After the host vehicle 302 determines that the passing vehicle 308 will enter the trajectory of the host vehicle 302, the host vehicle 302 determines whether the passing vehicle 308 is passing through the trajectory of the host vehicle 302. In some implementations, the host vehicle 302 determines that the passing vehicle 308 is passing through the trajectory of the host vehicle 302 when the host vehicle 302 determines that a lateral speed of the passing vehicle 308 has not decreased from one meter per second as the passing vehicle 308 passes through the trajectory of the host vehicle 302.

When the host vehicle 302 determines that the passing vehicle 308 is passing through the trajectory of the host vehicle 302, the host vehicle 302 determines whether to maintain the follow distance 306 to the target vehicle 304 as the passing vehicle 308 passes through the trajectory of the host vehicle 302. In the illustrative example, the host vehicle 302 determines that the passing vehicle 308 is traveling at a longitudinal speed of approximately 24.98 meters per second. Because the longitudinal speed of the passing vehicle 308 at 24.98 meters per second is greater than the longitudinal speed of the host vehicle 302 at 20 meters per second, the host vehicle 302 determines to maintain the follow distance 306 to the target vehicle 304 as the passing vehicle 308 passes through the trajectory of the host vehicle 302. However, if should be noted that in other instances if the host vehicle 302 were to determine that the passing vehicle 308 was travelling at a longitudinal speed that was less than the host vehicle 302, the host vehicle 302 would adjust its follow distance 306 in order to establish a safe distance to the passing vehicle 308.

As discussed above, FIGS. 1-3 and their accompanying description teach systems and methods for an adaptive cruise control that is able to better control a speed of a host vehicle as another vehicle quickly passes through a trajectory of the host vehicle. By maintaining a follow distance to a target vehicle as a passing vehicle quickly passes between the host vehicle and the target vehicle, the host vehicle refrains from speeding up while the passing vehicle is in the trajectory of the host vehicle, and then slowing down to reestablish a safe follow distance to the target vehicle when the passing vehicle exits the trajectory of the host vehicle.

The foregoing disclosure has been set forth merely to illustrate the invention and is not intended to be limiting. Since modifications of the disclosed form and implementations incorporating the spirit and substance of the invention may occur to persons skilled in the art, the invention should be construed to include everything within the scope of the appended claims and equivalents thereof.

What is claimed is:

1. A system comprising:
   a memory;
   at least one processor of a host vehicle, where the at least one processor is configured to execute instructions stored in the memory and to:
   determine that a passing vehicle is entering a trajectory in which the host vehicle is travelling based on a longitudinal speed, a longitudinal acceleration, a lateral speed, and a lateral acceleration of the passing vehicle;
   after determining that the passing vehicle is entering the trajectory in which the host vehicle is travelling, determine to maintain a follow distance of an adaptive cruise control system of the host vehicle to at least one target vehicle in the trajectory in which the host vehicle is traveling prior to the passing vehicle entering the trajectory; and
   maintain the follow distance to the at least one target vehicle while the passing vehicle passes through the trajectory in which the host vehicle and the at least one target vehicle are traveling;
   wherein to determine that the passing vehicle is passing through the trajectory in which the host vehicle is travelling, the at least one processor is configured to:
   determine that a lateral speed of the passing vehicle is not decreasing at any time while passing through the trajectory in which the host vehicle is travelling.

2. The system of claim 1, wherein the at least one processor is further configured to:
   determine the longitudinal speed, the longitudinal acceleration, the lateral speed, and the lateral acceleration of the passing vehicle based on information from a sensor of the host vehicle that is configured to collect information related to the longitudinal speed, the longitudinal acceleration, the lateral speed, and the lateral acceleration of the passing vehicle.

3. The system of claim 2, wherein the sensor comprises at least one of a radar, a LIDAR sensor, a camera, or a positioning sensor.

4. The system of claim 1, wherein the longitudinal speed, the longitudinal acceleration, the lateral speed, and the lateral acceleration of the passing vehicle are received from the passing vehicle via vehicle-to-vehicle communications.

5. A system comprising:
   a memory;
   at least one processor of a host vehicle, where the at least one processor is configured to execute instructions stored in the memory and to:
   determine that a passing vehicle is entering a trajectory in which the host vehicle is travelling based on a longitudinal speed, a longitudinal acceleration, a lateral speed, and a lateral acceleration of the passing vehicle;
   after determining that the passing vehicle is entering the trajectory in which the host vehicle is travelling, determine to maintain a follow distance of an adaptive cruise control system of the host vehicle to at least one target vehicle in the trajectory in which the host vehicle is traveling prior to the passing vehicle entering the trajectory; and maintain the follow distance to the at least one target vehicle while the passing vehicle passes through the trajectory in which the host vehicle and the at least one target vehicle are traveling;

wherein to determine to maintain a follow distance of the adaptive cruise control system of the host vehicle to at least one target vehicle in the trajectory in which the host vehicle is traveling prior to the passing vehicle entering the trajectory, the at least one processor is configured to:

determine that as the passing vehicle passes through the trajectory of the host vehicle, the host vehicle traveling at the current follow distance will be able to maintain a predefined distance to both the passing vehicle and the at least one target vehicle in the trajectory of the host vehicle prior to the passing vehicle entering the trajectory of the host vehicle.

6. The system of claim 5, wherein the predefined distance is at least a three second follow time.

7. The system of claim 1, wherein to determine to maintain the follow distance of the adaptive cruise control system to the at least one target vehicle in the trajectory of the host vehicle, the at least one processor is further configured to:

determine that the host vehicle is traveling at a longitudinal speed that is less than a set longitudinal speed of the host vehicle in the adaptive cruise control system.

8. The system of claim 1, wherein to determine to maintain the follow distance of the adaptive cruise control system to the at least one target vehicle in the trajectory of the host vehicle, the at least on processor is further configured to:

determine that the host vehicle is travelling at a longitudinal speed that is less than the longitudinal speed of the passing vehicle.

9. The system of claim 1, wherein the trajectory in which the host vehicle is travelling is a lane in which the host vehicle is travelling.

10. A method comprising:

determining, with at least one processor of a host vehicle, that a passing vehicle is entering a trajectory in which the host vehicle is travelling based on a longitudinal speed, a longitudinal acceleration, a lateral speed, and a lateral acceleration of the passing vehicle;

after determining that the passing vehicle is entering the trajectory in which the host vehicle is travelling, determining, with the at least one processor, to maintain a follow distance of an adaptive cruise control system of the host vehicle to at least one target vehicle in the trajectory of the host vehicle in which the host vehicle is traveling prior to the passing vehicle entering the trajectory; and maintaining, with the at least one processor, the follow distance of the adaptive cruise control of the host vehicle to the at least one target vehicle while the passing vehicle passes through the trajectory in which the host vehicle and the target vehicle are traveling;

wherein determining that the passing vehicle is passing through the trajectory in which the host vehicle is travelling comprises:

determining, with the at least one processor, that a lateral speed of the passing vehicle is not decreasing at any time while passing through the trajectory in which the host vehicle is travelling.

11. The method of claim 10, further comprising:

determining, with the at least one processor, the longitudinal speed, the longitudinal acceleration, the lateral speed, and the lateral acceleration of the passing vehicle based on information from a sensor of the host vehicle that is configured to collect information related to the longitudinal speed, the longitudinal acceleration, the lateral speed, and the lateral acceleration of the passing vehicle.

12. The method of claim 11, wherein the sensor comprises at least one of a radar, a LIDAR sensor, a camera, or a position sensor.

13. The method of claim 10, wherein the longitudinal speed, the longitudinal acceleration, the lateral speed, and the lateral acceleration of the passing vehicle are received from the passing vehicle via vehicle-to-vehicle communications.

14. A method comprising:

determining, with at least one processor of a host vehicle, that a passing vehicle is entering a trajectory in which the host vehicle is travelling based on a longitudinal speed, a longitudinal acceleration, a lateral speed, and a lateral acceleration of the passing vehicle;

after determining that the passing vehicle is entering the trajectory in which the host vehicle is travelling, determining, with the at least one processor, to maintain a follow distance of an adaptive cruise control system of the host vehicle to at least one target vehicle in the trajectory of the host vehicle in which the host vehicle is traveling prior to the passing vehicle entering the trajectory; and maintaining, with the at least one processor, the follow distance of the adaptive cruise control of the host vehicle to the at least one target vehicle while the passing vehicle passes through the trajectory in which the host vehicle and the target vehicle are traveling;

wherein determining to maintain a follow distance of the adaptive cruise control system of the host vehicle to at least one target vehicle in the trajectory in which the host vehicle is traveling prior to the passing vehicle entering the trajectory comprises:

determining, with the at least one processor, that as the passing vehicle passes through the trajectory of the host vehicle, the host vehicle traveling at the current follow distance will be able to maintain a predefined distance to both the passing vehicle and the at least one target vehicle in the trajectory of the host vehicle prior to the passing vehicle entering the trajectory of the host vehicle.

15. The method of claim 14, wherein the predefined distance is at least a three second follow time.

16. The method of claim 10, wherein determining to maintain the follow distance in the adaptive cruise control system to the target vehicle in front of the host vehicle further comprises:

determining, with the at least one processor, that the host vehicle is traveling at a longitudinal speed that is less than a set longitudinal speed of the host vehicle in the adaptive cruise control system.

17. The method of claim 10, wherein determining to maintain the follow distance of the adaptive cruise control system to the at least one target vehicle in the trajectory of the host vehicle further comprises:

determining, with the at least one processor, that the host vehicle is travelling at a longitudinal speed that is less than the longitudinal speed of the passing vehicle.

18. The method of claim 10, wherein the trajectory in which the host vehicle is travelling is a lane in which the host vehicle is travelling.

\* \* \* \* \*